United States Patent [19]
Neill et al.

[11] Patent Number: 5,711,787
[45] Date of Patent: Jan. 27, 1998

[54] OXYGEN RECOVERY PRESSURE SWING ADSORPTION PROCESS

[75] Inventors: Allastair Neill, Mississauga, Canada; Frederick Wells Leavitt, Amherst, N.Y.; Antonio Felippe Zaccur Figueiredo, Niteroi, Brazil

[73] Assignee: Praxair Technology, Inc., Danbury, Conn.

[21] Appl. No.: 561,654

[22] Filed: Nov. 22, 1995

[51] Int. Cl.⁶ .................................................. B01D 53/053
[52] U.S. Cl. .................. 95/96; 95/106; 95/117; 95/121; 95/130; 95/139
[58] Field of Search .................. 95/95–105, 130, 95/106, 114, 117, 121, 139

[56] References Cited

U.S. PATENT DOCUMENTS

| | | | |
|---|---|---|---|
| 3,140,931 | 7/1964 | McRobbie | 95/130 X |
| 3,237,377 | 3/1966 | Skarstrom | 95/130 X |
| 3,323,288 | 6/1967 | Cheung et al. | 95/104 |
| 3,636,679 | 1/1972 | Batta | 95/130 X |
| 3,922,149 | 11/1975 | Ruder et al. | 95/130 X |
| 3,973,931 | 8/1976 | Collins | 55/58 |
| 4,065,272 | 12/1977 | Armond | 95/130 X |
| 4,329,158 | 5/1982 | Sircar | 95/130 X |
| 4,519,813 | 5/1985 | Hagiwara et al. | 95/130 X |
| 4,552,571 | 11/1985 | Dechene | 95/130 X |
| 4,673,415 | 6/1987 | Stanford | 95/130 X |
| 4,756,723 | 7/1988 | Sircar | 95/103 |
| 4,822,384 | 4/1989 | Kato et al. | 55/158 |
| 4,826,510 | 5/1989 | McCombs | 55/179 |
| 4,892,566 | 1/1990 | Bansal et al. | 55/26 |
| 4,917,710 | 4/1990 | Haruna et al. | 55/26 |
| 5,078,757 | 1/1992 | Rottner et al. | 55/26 |
| 5,169,415 | 12/1992 | Roettger et al. | 55/68 |
| 5,328,503 | 7/1994 | Kumar et al. | 95/101 |
| 5,403,385 | 4/1995 | Pan | 95/130 X |
| 5,407,465 | 4/1995 | Schaub et al. | 95/130 X |
| 5,411,578 | 5/1995 | Watson et al. | 95/101 |
| 5,429,666 | 7/1995 | Agrawal et al. | 95/101 |
| 5,453,112 | 9/1995 | Sinicropi et al. | 95/130 X |
| 5,529,607 | 6/1996 | Tan | 95/100 X |
| 5,540,758 | 7/1996 | Agrawal et al. | 95/101 |

*Primary Examiner*—Robert Spitzer
*Attorney, Agent, or Firm*—Robert J. Follett

[57] ABSTRACT

A pressure swing process for air separation to produce concentrated gaseous oxygen at an elevated pressure without the requirement of further compression of the gaseous oxygen product. The process comprises the steps of compressing the feed air to a pressure in the range of approximately 45 psig to 105 psig, preheating the feed air to each of the adsorption beds to a temperature in the range of approximately 100° F. to 200° F., then directing flow of the feed air cyclically into and through at least two crystalline zeolite molecular sieve adsorption beds for selectively adsorbing at least nitrogen therein. In this manner, oxygen having a purity of approximately 88% to 93% at a recovery of approximately 30% to 45% and a bed size factor in the range of 2,500 pounds to 4,000 pounds of adsorbent per ton per day of oxygen can be delivered to a receptor tank at an elevated pressure of approximately 40 psig to 100 psig.

18 Claims, 3 Drawing Sheets

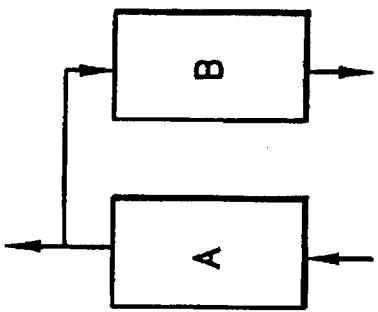
FIG. 2A-1
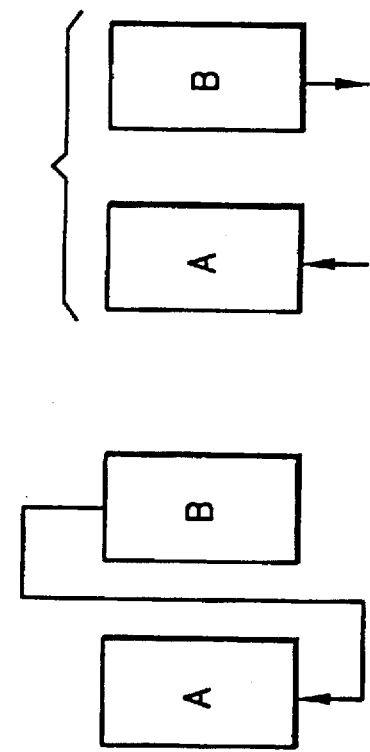
FIG. 2A-2
FIG. 2B
FIG. 2C
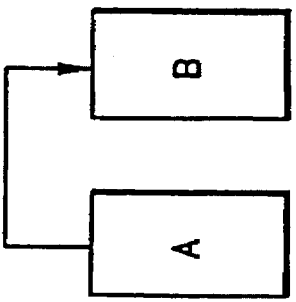
FIG. 2D-1
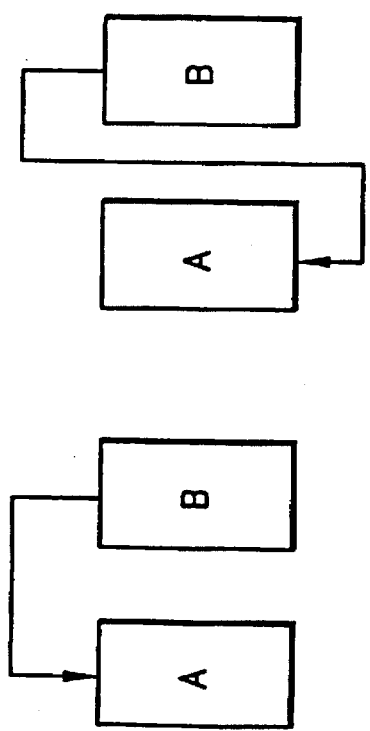
FIG. 2D-2
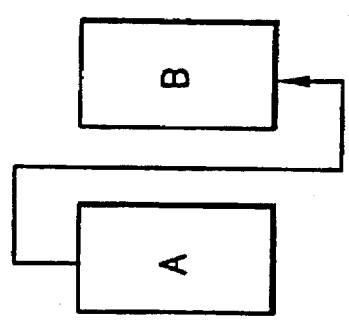
FIG. 2E
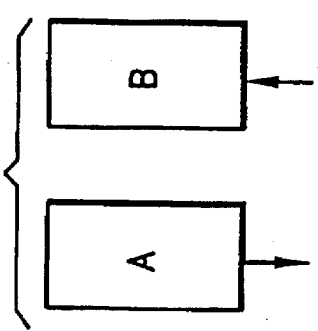
FIG. 2F
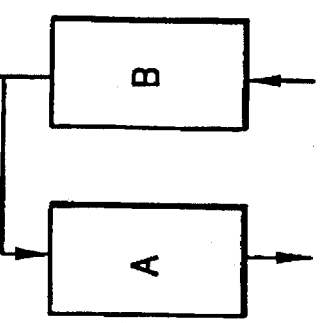

OXYGEN RECOVERY PRESSURE SWING ADSORPTION PROCESS

BACKGROUND OF THE INVENTION

1. Field of the Invention

This invention relates generally to a process for separating air by pressure swing adsorption and, more specifically, for recovering oxygen at an elevated pressure without requiring product compression.

2. Description of the Prior Art

In the prior art pressure swing processes for air separation, the cycle sequence usually includes a selective adsorption step during which compressed air is introduced at the adsorbent bed inlet, or feed end, thereby forming a nitrogen adsorption front, nitrogen being selectively adsorbed by adsorbents as, for example, zeolitic molecular sieves. Oxygen is also coadsorbed but substantially displaced by the more strongly held nitrogen adsorbate. Oxygen effluent gas is discharged from the opposite discharge, or product end of the bed, at about the feed air pressure and the nitrogen adsorption front moves progressively toward the product end. The adsorption step is terminated when the front is intermediate the feed and product ends, and the bed is co-currently de-pressurized with oxygen effluent being released from the product end and the nitrogen adsorption front moving into the previously unloaded section closer to the product end. The co-current de-pressurization gas may in part be discharged as oxygen product and in part returned to other adsorbent beds for a variety of purposes, for example, purging and pressure equalization with a purged bed for partial re-pressurization thereof. Co-current de-pressurization is terminated before the front reaches the product end so that the oxygen purity of the effluent is nearly that of the gas discharged during the preceding adsorption step.

The term "co-current flow" through an adsorbent bed represents the flow of gas in the direction of the air feed flow through the same bed. In contrast, counter-current flow through an adsorbent bed represents the flow of gas in a direction opposite that of the air feed flow.

The co-currently de-pressurized bed is usually further de-pressurized by releasing waste gas through the feed end, i.e. countercurrently de-pressurized, until the bed pressure diminishes to a desired low level for purging. Then oxygen purge gas is caused to flow through the bed to desorb the nitrogen adsorbate and carry it out of the system. The purged and at least partly cleaned bed is then re-pressurized at least partly with oxygen and/or feed air and returned to the adsorption step.

SUMMARY OF THE INVENTION

The present invention relates to such a pressure swing process for air separation and serves to produce concentrated gaseous oxygen at an elevated pressure without the requirement of further compression of the gaseous oxygen product. The process comprises the steps of compressing the feed air to a pressure in the range of approximately 45 psig to 105 psig, preheating the feed air to each of the adsorption beds to a temperature in the range of approximately 100° F. to 200° F., then directing flow of the feed air cyclically into and through at least two crystalline zeolite molecular sieve adsorption beds for selectively adsorbing at least nitrogen therein. In this manner, oxygen having a purity of approximately 88% to 95% at a recovery of approximately 30% to 45% and a bed size factor in the range of 2,500 pounds to 4,000 pounds of adsorbent per ton per day of oxygen can be delivered to a receptor tank at an elevated pressure of approximately 40 psig to 100 psig.

The objective of the invention is to produce about 93% purity oxygen through the pressure swing adsorption process with product produced at pressures exceeding 70 psig with recoveries of at least 35% and small bed size factors of less than 3,500. As noted, no product compressor is to be used to achieve this final product pressure.

The above objectives could be met with known prior art provided the product pressure was kept under 45 psig. However, heretofore, when product pressure in the range of over 70 psig was desired without using product compression, the known system required high feed air pressure of about 100 psig with air compression ratio of over 7. This, in turn, exacerbated the adverse thermal gradients in the adsorbent beds making it difficult to achieve the desired combination of high product pressure and purity, good product recovery, and small bed size factors.

A significant advance in the state of the art occurred with the advent of U.S. Pat. No. 3,673,931 to J. J. Collins entitled "Air Separation by Adsorption". Collins recognized that the adsorbent beds experience a sharply depressed temperature zone at the inlet or feed end of the adsorption bed due mainly to the desorption of air contaminants such as $CO_2$ and moisture, especially when high $O_2$ recovery is desired. His proposed solution was to heat the inlet end of the bed to achieve high air feed temperatures (below 175° F.), preferably between 100° F. and 150° F. to mitigate the average temperature depression in the bed. He achieved product $O_2$ purity of about 90% with recovery of 55% at a product pressure of 40 psig using a bed size factor of about 4,800 pounds of sieve per tons per day (TPD) of oxygen product.

The Collins teachings considered four, three, and two bed systems and required about 1,200 pounds of sieve per bed for a 4-bed system. Using a 3-bed cycle, Collins achieved bed size factors of over 5,500 pounds per ton of oxygen produced. Although no figures are provided for a two-bed process, the bed size factors achieved by the present invention of 3,000 to 3,500 pounds per ton of oxygen produced are a significant improvement over the Collins system. Collins' figures were achieved with a feed dewpoint of −40° F. and with the $CO_2$ removed, while a much higher product pressure of about 70 psig has been achieved according to the present invention using a lower bed-size-factor (BSF) and with a much higher dewpoint of +40° F. and without removing $CO_2$.

Collins' two-bed cycle used a 120 second cycle to achieve a product pressure of 40 psig. In contrast, by extending the cycle to 240 seconds and with the addition of a product surge tank, according to the present invention, the product pressure has been increased to a magnitude in excess of 70 psig. Furthermore, by accepting the lower product purity (90%) mentioned in the Collins patent, the recovery attainable by the process of the present invention can exceed 35% and still achieve higher product pressures.

During the pressure equalization step, there is an opportunity to transfer some of the gas from the top, or product end, of one vessel or bed to the bottom, or feed end, of the other vessel or bed. Unlike Collins who suggests introducing product oxygen from the product end of one bed to the feed end of the other bed, one method according to the present invention would be to transfer initially from the product end of one bed to the product end of the other bed, thereby introducing the higher oxygen content gas to the product end of the bed being pressurized. Near the end of the step is the best time to transfer the oxygen from the product end of bed B to the feed end of bed A because that is the time during the step when the pressure in bed A is closer to the designated maximum pressure during the step. The relatively high pressure in bed A reduces the migration of nitrogen and other impurities from the feed end of the bed toward the product end. Another reason for doing this top-to-bottom transfer late in the step is that the concentration of impurities in the gas being transferred is highest near the end of the step. Concentrating the top-to-bottom equalization near the end of the step reduces migration of nitrogen toward the product end of the bed being pressurized while still using the top-to-bottom equalization to reduce the temperature gradient in bed A.

In a four-minute equalization (Step A as shown in FIG. 2) one might use top-to-top equalization for the first three minutes and follow that with a one-minute top-to-bottom equalization. Since the pressure in bed A rises during the step, its pressure would be higher during the top-to-bottom equalization.

In comparing the present invention with that disclosed in the Collins patent, significant differences include the number of beds utilized, the maximum product pressure, and the feed air temperature. These can be clearly seen in Table A provided below.

nants as in the Collin's patent. Referring to Table A, the primary difference of the invention as compared with the prior art as disclosed in the Collins patent that result in the above improved performance is the unique combination of conditions, comprising:

1. long cycle time of approximately 240 seconds at which point Collins paid significant bed-size-factor (BSF) penalty (items 4 and 5).

2. high feed air temperature of 170° F., which in combination with lower product pressure and faster cycle resulted in lower purity and higher BSF for Collins (item 2).

3. use of air as well as product surge tanks;

4. optionally, use of a compound bed using alumina at the feed end followed by a 13× molecular sieve for the bulk air separation could further enhance the system performance of the invention.

It should be noted that product recovery is the only parameter, for which Collins has an edge over the present invention but not without penalties in all other desired parameters, namely high product pressure, high product purity and low BSF (items 3, 4 and 5).

The above indicated improved performance at much higher product pressure is surprisingly achieved in spite of the higher feed air pressure which tends to cause greater adverse thermal gradients in a bed and higher feed air

TABLE A

| Item | Data Source | # of Beds | Product O₂ Purity, % | Product O₂ Pressure, psig | Air Feed Temp, °F. | Cycle Time, Sec | Oxygen Recovery | BSF, #/TPD |
|---|---|---|---|---|---|---|---|---|
| 1 | Present Invention | 2 | 93.3 | 77.5 | 170 | 240 | 36.9 | 3,056 |
| 2 | Prior Art, | 3 | 87 | 1–3 | 175 | 120 | 32.7 | 4,500 |
| 3 | Collin U.S. | 3 | 90 | 1–3 | 100 | 120 | 38.1 | 5,000 |
| 4 | Pat. No. | 4 | 90 | 40 | 64 | 240 | 39.8 | 5,600 |
| 5 | 3,973,931 | 4 | 89.3 | 40 | 100 | 240 | 46.4 | 4,950 |

With the four bed cycle, Collins is said to have achieved a product purity of 89.3% with a product pressure of 40 psig and a bed size factor of 4950 pounds per TPD while achieving a recovery of 46.4%. The present invention utilizes a two-bed cycle with a product surge tank which would typically suggest a higher bed size factor. However, a lower bed size factor was achieved of about 3,000 pounds per TPD at a higher purity, specifically 93.3%, and much higher product pressures, specifically 77.5 psig. In addition, much higher feed air temperatures were used, 170° F. versus 100° F., while relatively good recovery of 36.9% was achieved. The three-bed process of Collins ran lower feed air temperatures (100° F. versus 175° F.) and at much lower pressures (1 to 3 psig) while achieving lower product purity and similar recoveries. One would have expected much higher recoveries at the lower pressure and better bed size factors with more beds that Collins used than for the two-bed system of the present invention.

A small (1–2 tons per day) and relatively simple pressure adsorption system for oxygen recovery utilizing the principles of the invention is thus seen to produce 93% pure oxygen at pressures above 70 psig with over 35% recovery. Further, such a low cost system avoids the use of a product compressor and associated gas coolers as previously required.

The key achievement of the invention is production of high pressure (>70 psig) oxygen with higher purity and good recovery at much lower bed-size factor and without product compression and without full prepurification of air contamidewpoint (40° F. versus −40° F. in the prior art), which also contributes to greater temperature depression at the feed end of the bed, using only 2 beds as compared to 3 and 4 bed systems as in the Collins patent, using long cycle time (240 second) generally associated with larger BSF and using high feed air temperature (170° F.) which tends to reduce adsorption capacity and thus increase BSF.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

BRIEF DESCRIPTION OF THE DRAWINGS

FIGS. 2A–2F schematically represent a plurality of successive steps for performing the process of the invention; also illustrated are FIGS. 2AA and 2DD, which represent, respectively, optional steps of a modified process of the invention.

DETAILED DESCRIPTION OF THE INVENTION

Figure 1A:
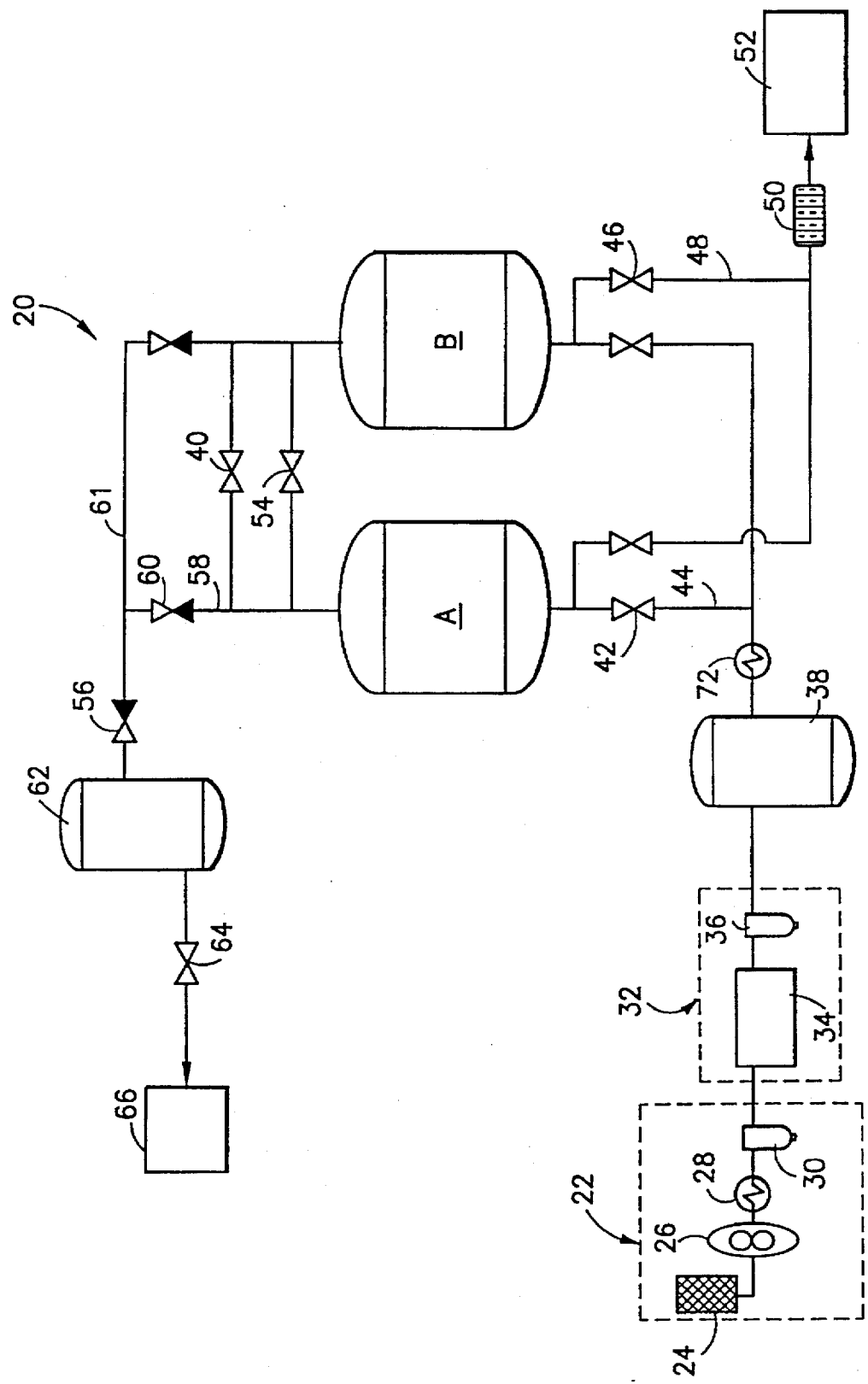
FIG. 1A is a flow schematic diagram of a pressure swing adsorption process embodying the present invention.

Turn now to the drawings and initially to FIG. 1A which illustrates, schematically, a pressure swing adsorption system 20 provided in accordance with the present invention for producing high pressure oxygen.

The system 20 includes an air compressor unit 22 which encompasses filter 24, compressor 26, after cooler 28, and moisture separator 30, a refrigerated air dryer unit 32 which encompasses a heat exchanger 34, a further moisture separator 36, an air surge tank 38, a heater 72, two adsorbent beds A and B, and a product surge tank 62. The air surge tank is particularly desirable for increasing the production rate if the size of the compressor 26 is limited. However, the primary function of the air surge tank is to even out flow into the beds A and B, to assure a more uniform flow and pressure distribution through and within the beds.

To achieve the favorable results stated above, a feed air stream is directed through the air compressor unit 22, cleansed by the filter 24, then compressed by the compressor 26 to a pressure 8–10 psig higher than the desired product pressure.

If a final product pressure of 77 psig is attained, the maximum pressure in the pair of sieve beds A and B may reach 87 psig. The sieve beds A and B are substantially identical and may be, for example, crystalline zeolite molecular sieve adsorption beds of at least 4 angstroms apparent pore size (13× molecular sieve) capable of adsorbing at least nitrogen therein. In this instance, certain allowances would be made for piping losses from the air compressor to the sieve beds such that the feed air pressure from the compressor would be about 95 psig. Unlike Collins' use of prepurifiers, the moisture in the feed air stream is removed by cooling the feed air stream in a refrigerated dryer so that the dewpoint of the feed air stream does not exceed 40° F. versus −40° F., in the case of Collins. The feed air stream is then reheated in heater 72 prior to injection into the sieve beds. While Collins indicated that the optimum feed air temperature to maximize recovery was between 100° F. and 150° F. the experience of the inventors showed that by using 13×sieve material, preheating of the air should be at temperatures in excess of 140° F. up to approximately 170° F. to achieve good recoveries. In any event, it is desirable for the bottoms of the beds to maintain a temperature around 40° F.

Viewing FIG. 2A, the cycle herein proposed is initiated with bed B at maximum pressure, typically 88 psig, and bed A which is at or close to ambient pressure. With all other valves depicted in FIG. 1 being preferably closed, a pressure equalization valve 40 connecting the two beds is opened and pressurized gas is fed to bed A from bed B under a controlled flow rate. The beds should come as close to each other in pressure as possible within a reasonable time, with a likely optimum pressure differential of 5–7 psig resulting after a duration for this step of 30 to 35 seconds.

Preferably, this step should end with the configuration shown in the optional step, as seen in FIG. 2AA. In this instance, the last part of the equalization thus ends with gas flowing from the top of bed B into the bottom of bed A. It will be understood that the configurations of the systems illustrated in FIG. 1A and FIG. 1B would be modified accordingly to accomodate such an outcome.

Next, viewing FIG. 2B, a feed air valve 42 on a feed air line 44 is opened and the pressure in bed A is raised to a pressure, generally in the range of 74 psig, at the rate of approximately 1 psi per second. In this instance, preferably, the only other valve of the system 20 which is opened is a blowdown valve 46 in discharge line 48, as will be discussed below. Raising the pressure in bed A is accomplished by the introduction of preheated feed air from the compressor unit 22 through the feed end of the bed A, that is, the opposite end from which the equalization flow occurred. It is important that the feed air be heated to a level sufficient to raise the minimum temperature that the sieve experiences to a level above 40° F. at a level one foot above the bottom of the sieve bed. The preheating of the feed air can be accomplished in a variety of ways but the most cost effective manner is to recuperate the heat of compression from the air feed compressor unit 22 and by means of the heat exchanger 72 elevate the feed air temperature. The feed air must have also been pretreated by having the dewpoint of the feed air reduced to 40° F. This can be achieved by the use of the commercially available refrigerant dryer unit 32. Faster rates may be used if care is taken to prevent lifting or fluidization of the sieve at the top of bed A. If care is taken not to fluidize the sieve in the bed, this step could be reduced time-wise, improving the output of the system and reducing the bed size factor.

While bed A is being pressurized to 85 to 90 psig (FIG. 2C), bed B has the remaining pressure released from the bottom or feed air end by opening the blowdown valve 46 to atmosphere. This blowdown step typically lasts 55 seconds, or about 1 psig per second, and brings the bed B to atmospheric pressure, discharging the adsorbed nitrogen from bed B via discharge line 48, suitable sound muffler 50, and into a waste nitrogen receiver 52. Once bed B is substantially de-pressurized, a purge valve 54 is opened to connect the product ends of both of the beds, and a controlled amount of a high pressure, high purity, stream of oxygen from the pressurized bed A is fed to the de-pressurized bed B. This purge step should last about 33 seconds. The amount of purge gas should be controlled such that the purity of the gas exiting the bottom, or feed end, of the de-pressurized bed B remains at 10 to 13% oxygen until near the end of the step and then the oxygen content of the gas flow should reach about 16 to 19% oxygen. This is to ensure that an excessive amount of oxygen gas is not used to purge the bed as this would detract from the overall system performance. While the purge step is being performed, the bed at pressure (bed A) is not only providing a small amount of purge gas, it is also filling the product surge tank to a pressure close to that of the maximum pressure seen at the product end of the bed at pressure. This is accomplished through a check valve 60 with a low cracking pressure. The product surge tank 62 is sized so that during the equalization step (FIG. 2A), the pressure in the tank does not fall below a minimum pressure requirement. The time of the step depicted in FIG. 2C is dictated by the length of time it takes to reach the maximum pressure of the bed.

Oxygen product, pressurized, is caused to flow from the product end of bed A through a check valve 60 in product line 58, then through a product make valve 56 in exit line 61 into an oxygen product storage tank 62. By reason of the process just described, the oxygen product in the storage tank 62 is already at an elevated pressure, ready for use. The oxygen product can then be withdrawn from the storage tank 62, as desired, by operation of an outlet valve 64, for delivery to a diagrammatically illustrated pipeline 66 or other suitable receptacle.

FIGS. 2D, 2E, and 2F illustrate steps in the process which are identical to the steps depicted in FIGS. 2A, 2B, and 2C except that the roles of beds A and B and their associated lines and valves are reversed.

Preferably, the step illustrated in FIG. 2D should end with the configuration shown in the optional step, as seen in FIG. 2DD. In this instance, the last part of the equalization thus ends with gas flowing from the top of bed A into the bottom of bed B. It will be understood that the configurations of the systems illustrated in FIG. 1A and FIG. 1B would be modified accordingly to accomodate such an outcome.

Figure 1B:
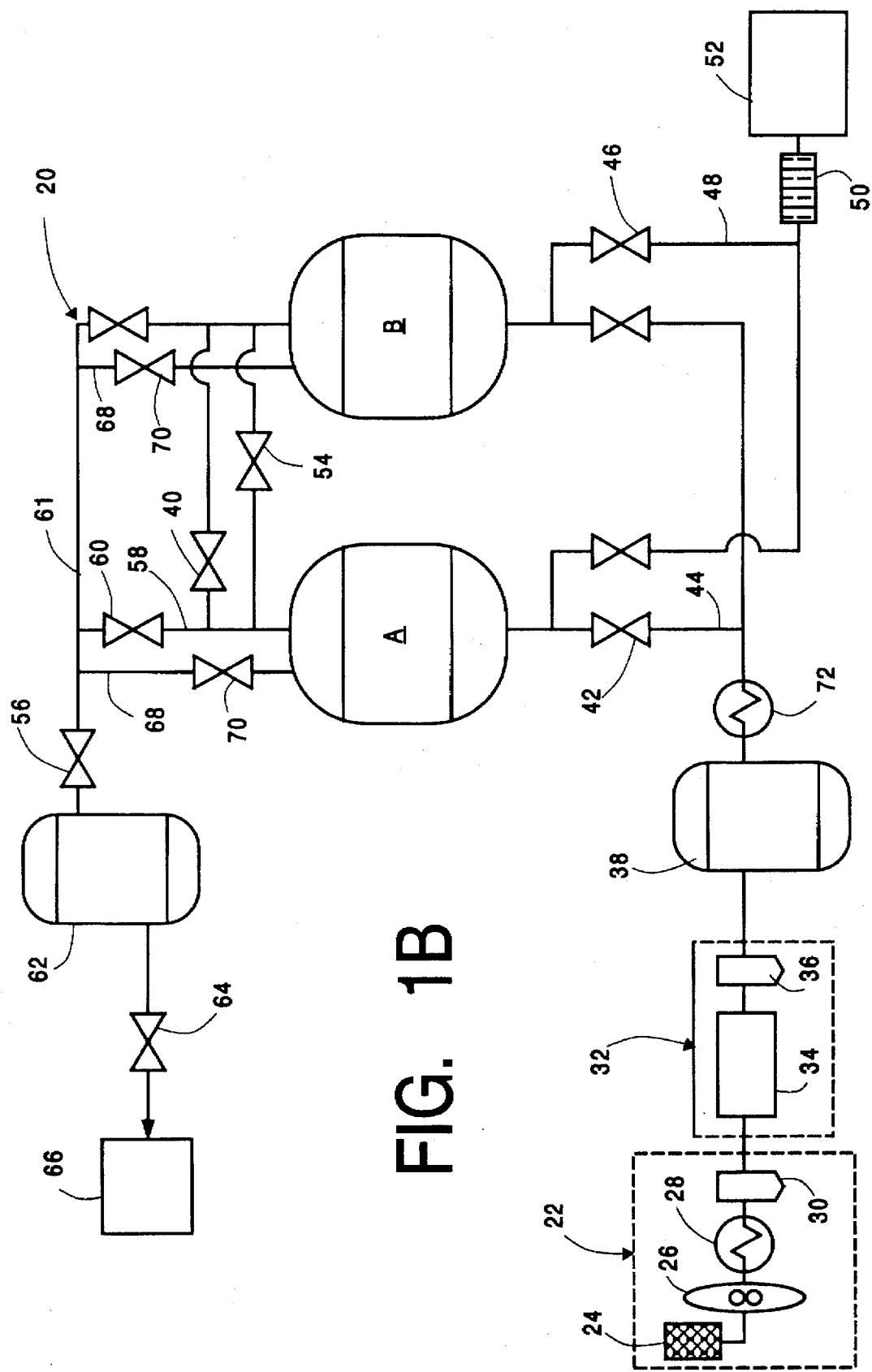
FIG. 1B is a flow schematic diagram of another embodiment of the present invention.

In another embodiment, as shown in FIG. 1B, a pair of supplemental product lines 68 may interconnect the product ends of the beds A and B with the exit line 61 and the flow through the lines 68 may be controlled by check valves 70 to allow flow of oxygen product only in the direction of the beds. With this construction, in the step depicted in FIG. 2C, for example, with the pressure equalization valve 40 and the purge valve 54 being closed, oxygen product produced from vessel A is directed into the product end of bed B to achieve the purging of bed B which was previously achieved with operation of the purge valve 54.

To produce one ton per day of contained oxygen with a purity of 93% (minimum) one would have to use 3,000 pounds of 13× sieve. This could be tried with other sieves such as 5A but with sieves that are designed to operate under vacuum during the de-pressurization step, one would expect a poorer performance.

For achieving the desired objective, tests were conducted involving variations in feed temperature, cycle time and valve size and its associated pressure drop. As indicated by Table A, above, various changes to the above parameters were made with varying results in product purity and pressure. For example, the 32 second time duration for the pressure equalization step of FIG. 2A could be further reduced with increased valve sizing, which should result in even higher product recoveries. If the 55 second time duration for the pressurization step of FIG. 2B is also reduced with improved valving and the bed maintained so as to prevent lifting, the recoveries should approach 40%.

There are other variations that could be tried to achieve similar improvements in performance. The predrying of the feed stream could be accomplished by a desiccant or pressure or thermal swing dryer or membrane dryer which would lower the amount of moisture or dewpoint of the feed air stream and possibly improve the performance. The feed air could also be preheated by using an auxiliary heating source in the air feed line, such as an immersion heater. Another way to take the water vapor and $CO_2$ out of the air feed stream prior to the air coming in contact with the sieve in one or the other of the beds A and B would be to put a layer of activated alumina in the bottom of the sieve bed. This would act as a weak adsorbent and reduce the refrigeration effect during the de-pressurization step. An optimum method of preheating the air feed stream would be to use a heat exchanger to capture the heat of compression from the air compressor and transfer this to the feed air stream. Other sources of energy are available including excess stream, warm process, and electricity. If sufficiently inexpensive, any of these can be used to pretreat the air stream.

While a preferred embodiment and an alternate embodiment of the invention have been disclosed in detail, it should be understood by those skilled in the art that various other modifications may be made to the illustrated embodiments without departing from the scope of the invention as described in the specification and defined in the appended claims.

We claim:

1. In a pressure swing adsorption process for the separation of at least one non-preferentially-adsorbable first gas from a gas mixture containing the first gas and one or more selectively-adsorbable second gas(es) in which the gas mixture is supplied cyclically to one of at least two adsorption beds capable of selectively adsorbing the second gas(es) at elevated pressure while passing the first gas therethrough to a receptor tank, each adsorption bed having a feed end into which the gas mixture is directed and a product end from which the first gas is withdrawn, the improvement comprising the steps of:

(a) compressing the gas mixture to a pressure in the range of approximately 45 psig to 105 psig; and (b) preheating the gas mixture of step (a) to a temperature in the range of approximately 100° F. to 200° F.;

(c) causing flow of the pressurized gas mixture into and through a first of at least two adsorption beds for selectively adsorbing therein the second gas;

(d) discharging from the product end of the first adsorption bed a first quantity of the first gas to the receptor tank at an elevated pressure in the range of 40 psig to 100 psig, with a purity of approximately 88% to 95%, and at a recovery of approximately 30% to 45%; and (e) substantially simultaneously with step (d), purging the second adsorption bed of the second gas.

2. A pressure swing adsorption process as set forth in claim 1 wherein step (e) includes the step of:

(f) discharging from the product end of the first adsorption bed and into the product end of the second adsorption bed a second quantity of the first gas being substantially less than the first quantity thereof.

3. A pressure swing adsorption process as set forth in claim 1 wherein step (e) includes the step of:

(f) discharging from the receptor tank to the product end of the second adsorption bed a second quantity of the first gas being substantially less than the first quantity thereof.

4. The pressure swing process as set forth in claim 1 wherein step (b) includes the step of:

(f) recuperating the heat of compression produced during step (a) for preheating the gas mixture.

5. The pressure swing process as set forth in claim 1 including the step of:

(f) providing surge reduction means upstream of each of the adsorption beds and in communication therewith.

6. The pressure swing process as set forth in claim 1 including the step of:

(f) prior to step (a), filtering the gas mixture to remove impurities therefrom.

7. A pressure swing adsorption process as set forth in claim 1 wherein the gas mixture is feed air, the first gas includes oxygen, and the second gas includes nitrogen.

8. A pressure swing adsorption process as set forth in claim 7 including the step of:

(f) performing each cycle within a time span of approximately 180 seconds to 300 seconds.

9. A pressure swing adsorption process as set forth in claim 7 wherein the process results in a bed size factor in the range of 2,500 pounds to 4,000 pounds of absorbent per ton per day of oxygen produced.

10. The pressure swing process as set forth in claim 7 including the step of:

(f) prior to step (c), reducing the dew point of the feed air to approximately 40° F.

11. The pressure swing process as set forth in claim 7 including the steps of:

(f) providing a layer of activated alumina in the bottom of each of the adsorption beds, and a layer of crystalline zeolite molecular sieve over said activated alumina layer in each of the adsorption beds;

(g) directing flow of the feed air through the layer of activated alumina to thereby minimize the content in the feed air of water vapor and carbon dioxide before flowing through the crystalline zeolite molecular sieve.

12. The pressure swing process as set forth in claim 7 wherein in step (a), the feed air is compressed to a pressure in the range of approximately 75 psig to 95 psig;

wherein, in step (b), the feed air to each of the adsorption beds is heated to a temperature in the range of approximately 170° F. to 180° F.; and wherein each cycle is performed within a time span of approximately 220 seconds to 260 seconds;

thereby resulting in the delivery to the receptor tank of oxygen at an elevated pressure in the range of 40 psig to 100 psig, with a purity of approximately 93%, at a recovery of approximately 37%, and the process using a bed size factor of approximately 3,100 pounds of adsorbent per ton per day of oxygen produced.

13. The pressure swing process as set forth in claim 1 including the steps of:

(f) following step (e), opening a line connecting the first and second beds to substantially equalize the pressure in the first and second beds;

(g) causing flow of the pressurized gas mixture into and through the second of said at least two adsorption beds for selectively adsorbing therein the second gas; and (h) simultaneous with step (g), decompressing the first bed to ambient pressure.

14. The pressure swing process as set forth in claim 13 wherein the pressure equalizing operation of step (f) includes:

(g) achieving a pressure differential in the range of approximately 5 to 7 psig within approximately seconds from inception thereof.

15. The pressure swing process as set forth in claim 13 wherein the decompression operation of step (h) is approximately 55 seconds in duration.

16. The pressure swing adsorption process as set forth in claim 13 wherein the gas mixture is feed air, the first gas includes oxygen, and the second gas includes nitrogen.

17. A pressure swing adsorption process as set forth in claim 13 wherein step (f) includes the step of:

(i) opening a line connecting the product end of the second bed to the feed end of the first bed.

18. A pressure swing adsorption process as set forth in claim 1 wherein the adsorption beds are comprised of 13× crystalline zeolite molecular sieve material.

* * * * *